United States Patent [19]
Baker

[11] 3,785,263
[45] Jan. 15, 1974

[54] CAMERA BELLOWS TO PREVENT DUST ENTERING THROUGH AN APERTURE THEREIN

[75] Inventor: James G. Baker, Winchester, Mass.
[73] Assignee: Polaroid Corporation, Cambridge, Mass.
[22] Filed: Sept. 18, 1972
[21] Appl. No.: 289,995

[52] U.S. Cl. .................. 95/39, 95/32, 95/11 V, 209/129, 55/155
[51] Int. Cl. .......................................... G03b 17/04
[58] Field of Search .................. 95/39, 40, 32, 33, 95/11 V; 55/103, 131, 155, DIG. 39; 209/127, 129

[56] References Cited
UNITED STATES PATENTS
3,594,989  7/1971  Bastiaans ..................... 55/155 X
3,680,287  1/1972  Wood et al. ..................... 55/524
1,219,801  3/1917  Bornmann ..................... 95/39
2,183,989  12/1939  Drotning ..................... 95/40 X Primary Examiner—Robert P. Greiner
Attorney—Michael Bard et al.

[57] ABSTRACT

A thin-walled, opaque, flexible envelope for excluding light from the exposure chamber of a camera is described. It has a dielectric insert of high resistivity to prevent dust and other airborne particulate matter from entering the exposure chamber through a small open aperture in the envelope. The aperture permits communication between a viewfinder associated with the camera and a focusing screen situated within the exposure chamber.

21 Claims, 4 Drawing Figures

PATENTED JAN 15 1974

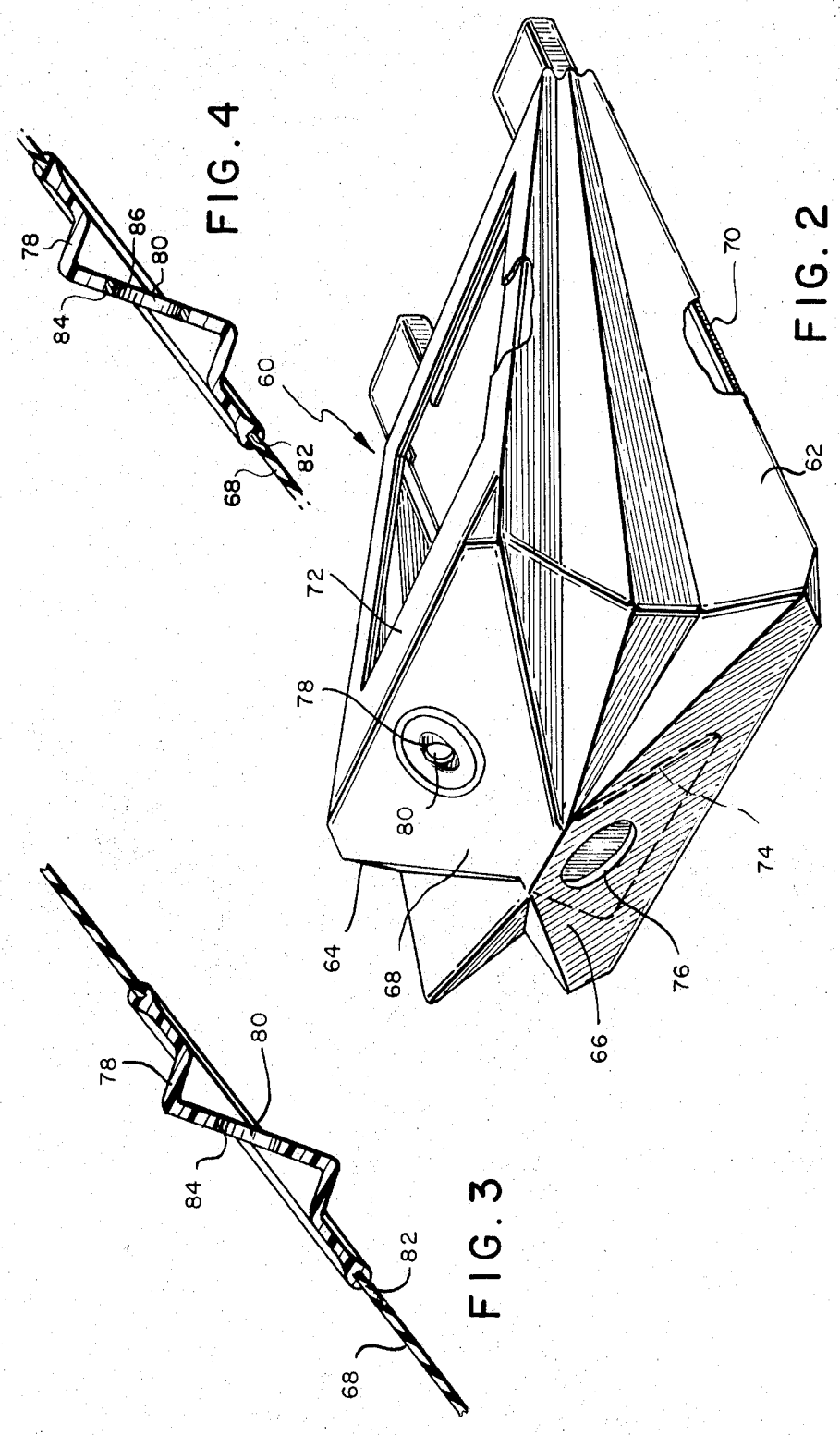

3,785,263

CAMERA BELLOWS TO PREVENT DUST ENTERING THROUGH AN APERTURE THEREIN

BACKGROUND OF THE INVENTION

Cameras of the collapsing or folding type tend to accumulate quantities of dust and other air-borne particulate matter inside their exposure chambers over an extended period of time. When such cameras are erected for use, they necessarily draw air into the exposure chamber through fissures and seams, etc., in the bellows or envelope enclosing the exposure chamber as it expands to operating size. The air carries dust inside with it, which then precipitates out of the air onto the surfaces within the envelope. Because the dust precipitates from the air within the camera, little if any of it will escape when the camera is folded up, collapsing the envelope and forcing out the air previously drawn in. Consequently, dust accumulates on the surfaces within the envelope. The problem of dust accumulating on a photosensitive surface is negligible since one frequently changes the photo-sensitive unit. However, dust accumulating on optical surfaces presents a more formidable problem. Optical surfaces within the envelope are not changed and they are not easily cleaned without diassembling the camera. The accumulating dust may scatter light incident thereon reducing contrast in photographs taken with the camera and also reducing it in images seen through a reflex viewer is one is used.

U.S. Pat. application Ser. No. 141,552, filed May 10, 1971, by James G. Baker, and entitled "A Compact Folding Reflex Camera" describes a collapsible camera of the type wherein inhibiting an accumulation of dust within its exposure chamber would be advantageous.

That camera has a finely ruled focusing screen within the envelope and a small opening in the upper wall of the envelope to permit light from the focusing screen to enter a viewfinder. The opening also permits air to move freely in and out of the envelope. Dust entering through the opening will deposit on the fine rulings of the focusing screen, changing their light distributing properties, as well as on the last surface of the objective lens.

SUMMARY OF THE INVENTION

The objects of the invention are achieved by locating electrostatic means for precipitating dust in the immediate vicinity of the small opening in the envelope. A simple form of electrostatic means that will precipitate dust on its immediate vicinity is an insert made from a dielectric material with an unusually high resistivity, such as polystyrene. The insert is formed with the desired opening that can serve as an entrance pupil for a viewfinder toward its center. It is attached to the envelope so as to locate the opening in the desired position. Electrostatic charges will accumulate on the polystyrene insert, because of its high resistivity, through a variety of causes including movement of air and dust through the hole in the polystyrene as the envelope expands and contracts. The electrostatic charges on the polystyrene insert around the opening will attract dust that would otherwise pass through the opening into the exposure chamber.

A modification of the present invention uses a metallic liner in the opening to prevent static charges from accumulating on the inside edges of the hole, but allow them to accumulate only on the surrounding surfaces. Thus, dust attracted by the charges will not affect the optical properties of the opening as an entrance pupil for the viewfinder.

Accordingly, an object of the present invention is inhibiting the passage of dust into the envelope enclosing the camera's exposure chamber.

Another object of the present invention is to collect dust that might otherwise pass through an opening in the envelope.

Other objects and many of the attendant advantages of the present invention will be better appreciated and the invention will become more clearly understood by reference to the accompanying drawings and to the following detailed description.

DESCRIPTION OF THE DRAWINGS

FIG. 2 illustrates the envelope and the electrostatic dust precipitator of the invention;

FIG. 3 illustrates an enlarged cross-sectional detail of a portion of the envelope, including the electrostatic dust precipitator; and FIG. 4 illustrates the enlarged cross-sectional detail of FIG. 3 with an improvement incorporated into the opening through the electrostatic dust precipitator.

THE PREFERRED EMBODIMENT

Figure 1:
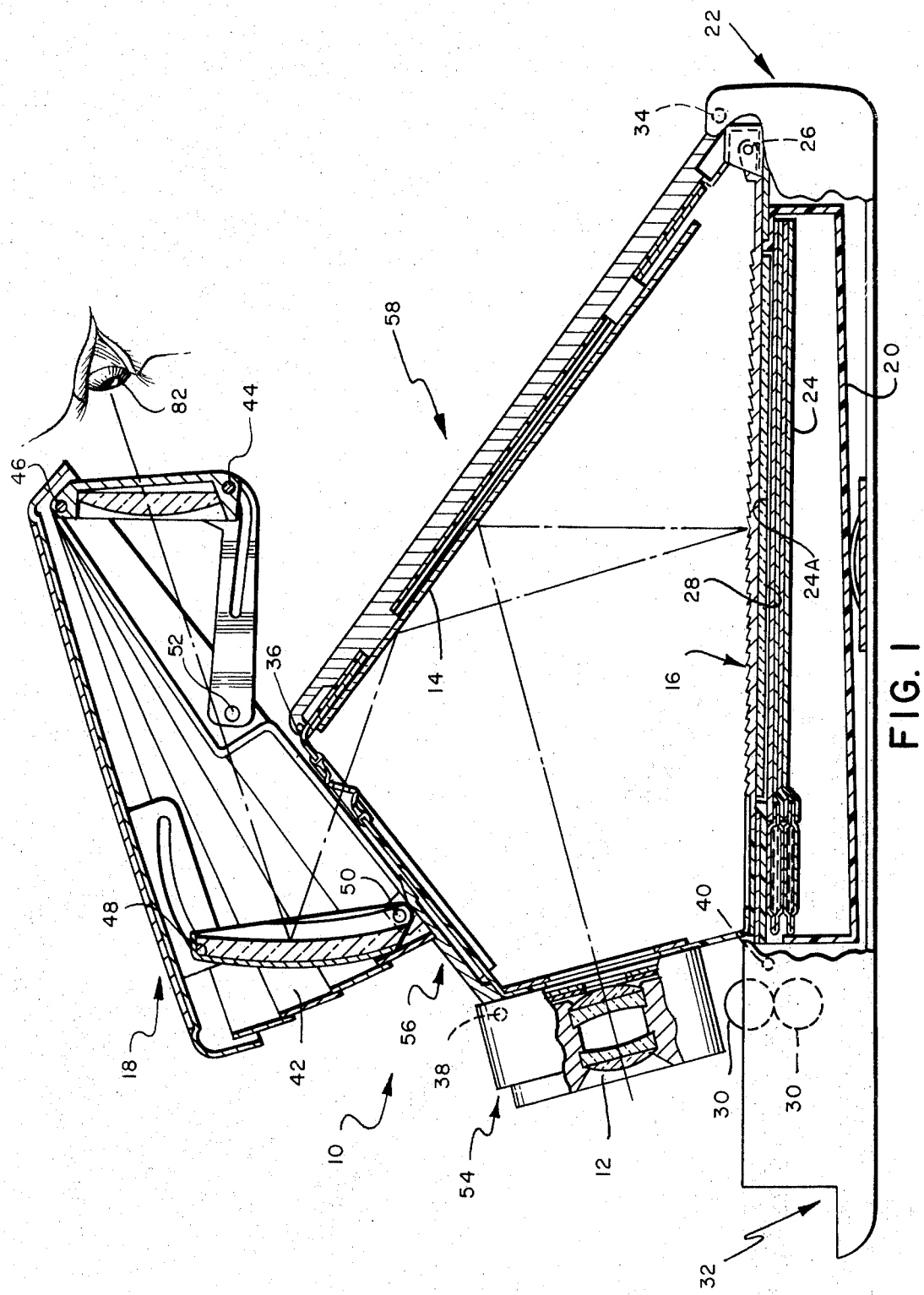
FIG. 1 illustrates a folding camera of the type that uses a thin-walled, opaque envelope to exclude light from the exposure chamber.

A principal application for electrostatic dust collectors according to the present invention is in a new type of folding reflex camera 10, such as described in Ser. No. 141,552, aforesaid, is illustrated in FIG. 1. Th reflex camera 10 includes an objective lens 12 together with a folding mirror 14 that reflects an image formed by the objective lens 12 to a focusing screen 16. It also includes a viewfinder 18 that receives light from the focusing screen 16 via a second reflection from the folding mirror 14 and forms therewith a magnified image of the scene to be photographed. The magnified image allows a photographer to easily aim and focus the reflex camera 10.

A film cassette 20, inserted in the base 22, positions a plurality of self-processing film units 24 beneath the focusing screen 16. To take a photograph, a control mechanism (not shown) rotates the focusing screen 16 upward about an axle 26 to bring a taking mirror 28 into a position parallel with the folding mirror 14. From its parallel position the taking mirror 28 reflects the image formed by the objective lens 12 onto the uppermost film unit 24a. After exposure of the uppermost film unit 24a, the control mechanism passes it out of the film cassette into the grip of a pair of pressure rolls 30. They process the film unit 24a in a well-known manner and cause it to emerge from the base 22 at an opening 32 where the photographer can recover it. A knowledge of the control mechanism that performs the foregoing operations and certain others is not necessary for an understanding of the present invention and reference may be had to U.S. Pat. application Ser. No. 134,733, filed Apr. 16, 1971, by Edwin H. Land, et al., and entitled "Reflex Camera," for a more detailed understanding of said control mechanism.

The folding camera 10 has several hinge points 34, 36, 38, and 40 that permit certain rigid members to collapse into positions adjacent the base 22. The supporting members of the viewfinder 18 and its interlocking cover 42 also have several hinge points 44, 46, 48, 50, 52 that permit the viewfinder 18 and its cover 42 to collapse into a small package on top of the rigid members of the camera 10, as more fully described in U.S. Pat. application Ser. No. 141,554, filed May 10, 1971, by P. F. Costa, et al., and entitled "Folding Camera." The resulting arrangement is small enough for carrying in a coat pocket, yet it can be erected into a camera for taking full-size snapshots.

The rigid members of the camera 10 when erected establish the general configuration of the exposure chamber. They include a lens-shutter housing 54, a short cover 56, and a long cover 58. An erecting arm (not shown) retains the rigid members 54, 56, and 58 in the arrangement shown until it is unlocked to allow folding the camera 10 closed. The sides of the exposure chamber, i.e., the kite-shape area bounded by the rigid members 54, 86, 58, and the base 22, have no rigid opaque structure to exclude light therefrom. A principal purpose of a thin-walled opaque envelope 60 situate within the frame formed by the rigid members 54, 56, 58, and the base 22 is to exclude light that would otherwise reach a photosensitive film unit through the kite-shape openings at the sides of the camera 10.

In the following description of the opaque envelope 60, reference should be had both to FIG. 1 and to FIG. 2. The envelope 60 comprises four main light excluding walls 62, 64, 66, and 68 plus flanges 70 and 72 on two sides. The walls include the lateral side walls 62, 64, used to close the kite-shape openings, the forward wall 66, and the upper wall 68. The lower flange 70 permits attaching the envelope 60 to the base 22 without obstructing the exposure plane where the film unit 24 lies or the operation of the focusing screen 16. The upper flange 72 allows attaching the envelope 60 to the long cover 58 without obstructing the folding mirror 14 or the upward movement of the focusing screen 16 with the taking mirror 28. A plate 74 inside the envelope 60 aids in properly securing the forward wall 66 to the lens-shutter housing 54. Any means for attaching the wall 66 and the flanges 70, 72 of the envelope 60 to the base 22 and the rigid members 54, 58 will suffice and it need not be described in detail. The plate 74 and the forward wall 66 have corresponding apertures 76, aligned with the objective lens 12, to permit light refracted by the objective lens 12 to enter the envelope 60.

The envelope 60 is made from a rubber-like compound containing a significant amount of carbon black. The carbon black contributes to the opacity of the envelope and minimizes the reflection of light off the envelope's surfaces. However, the carbon black also reduces the resistivity of the envelope markedly and the envelope will neither accumulate nor retain an appreciable electrostatic charge.

An insert 78, made from a material with a large resistivity, delineates an aperture 80 in the upper wall 68 of the envelope 60. The aperture 80 serves as an entrance pupil to the viewfinder 18 for light reaching it from the focusing screen 16 via reflection from the folding mirror 14. The envelope 60 is creased so it will fold flat when the camera 10 is closed.

As the rigid members 54, 56, and 58 move upwardly from the base 22 to erect the camera 10 for use, the envelope 60 is pulled into its open configuration through the attachments of forward wall 66 and upper flange 72 to the lens-shutter housing 54 and the long cover 58, respectively, and the attachment of lower flange 70 to the base 22. During erection, upper wall 68 carries the aperture 80 into the proper position to serve its function as an entrance aperture for the viewfinder 18.

The expansion of the envelope 60 during erection causes it to draw in air. Air can enter the envelope 60 around its points of attachment, but it enters principally through the aperture 80 carrying with it quantities of airborne dust and particulate matter. The dielectric insert 78 inhibits the entrance through the aperture 80 of dust that would otherwise accumulate on the optical surfaces inside the envelope 60.

Reference should be made to FIG. 3 showing an enlarged cross-section detail of the insert 78 mounted in upper wall 68. The plane of the aperture 80 is at an angle with respect to the plane of the upper wall 68 for considerations relating to the optics of the viewfinder 18 and not germane to an understanding of the present invention. The insert 78 has a circumferential groove 82 to receive the edge of an opening in the upper wall 68. An adhesive or other suitable means may also be used to retain the insert 78 in its proper position. The insert 78 should be opaque and made from a material with a very high resistivity. Its resistivity should be high in absolute terms and with reference to the resistivity of the envelope also. Two suitable materials are polystyrene, whose resistivity exceeds $10^{16}$ ohm-centimeters, and polytetrafluoroethylene, whose resistivity exceeds $10^{18}$ ohm-centimeters. It is useful to mold the insert 78 from the appropriate material without such fillers as carbon black to make it opaque. Opacity may be achieved instead by painting a black light-absorbing layer onto one side of the insert 78. The use of carbon black is undesirable because it reduces the resistivity of the final article. A high resistivity for the insert 78 is desirable because it will inhibit the draining of electrostatic charges accumulating on the insert 78resulting in greater charge densities and electrostatic potentials than would otherwise be the case.

Materials of high resistivity readily accumulate static charges. This phenomenon accounts for the frequently annoying tendency of plastic materials, which generally have a high resistivity, to attract and retain quantities of dust. In the present instance, this tendency is utilized to attract dust that would otherwise go through the aperture 80 when the envelope 60 draws air therethrough as it expands during the erection of the camera 10. Air and dust passing through the aperture 80 might give rise to the static charge accumulation on the insert 78. Also, rubbing between different parts of the structure during erection and operation of the camera 10 might also create the static charges.

A battery (not shown) or other power source may be associated with the camera 10 to operate several of its mechanisms, e.g., the processing rolls 30 and the shutter mechanism. If that is the case, it should be understood that the power source might also be harnessed to enhance the accumulation of static charges on the insert 78 and thus promote the removal of dust and airborne particulate matter from the air passing through the aperture 80.

The embodiment of the dust precipitator (the insert 78) illustrated in FIG. 3 will attract dust to all of its surfaces including the perimeter wall 84 of the aperture 80. Dust accumulating on the perimeter wall 84 will reduce the size of the aperture 80 and perhaps alter its shape slightly. Certain optical configurations useful in the viewfinder 18 would be sensitive in their performance to such changes in the aperture 80 since it serves as the entrance pupil to the viewfinder 18. FIG. 4 illustrates one means for inhibiting the accumulation of dust on the perimeter wall 84. A thin metal ring or electrically conducting film 86 lines the perimeter wall 84. Any static charged formed there will immediately be conducted off the perimeter wall 84. Grounding the ring 86 to some other part of the camera 10 will enhance this action. Since static charges will not accumulate on the conducting film 86 lining the perimeter wall 84, dust will not collect there either. Thus, no deleterious changes will occur in the size or shape of the aperture 80 (i.e., the entrance pupil).

One will now understand that the invention can have embodiments other than the preferred one. For example, the dust precipitator can be attached to, rather than inserted in, the envelope's wall; it can abut one side of the aperture rather than surround it. One will also understand that "wall means" encompasses the wall of the envelope by itself and together with the electrostatic dust precipitator attached thereto with aligned apertures through both.

It can readily be seen that many other variations and modifications of the present invention are possible in the light of the aforementioned teachings, and it will be apparent to those skilled in the art that various changes in form and in arrangement of components may be made to suit requirements without departing from the spirit and scope of the invention. It is, therefore, to be understood that within the scope of the appended claims the instant invention may be practiced in a manner otherwise than is specifically described herein.

What is claimed is:

1. An apparatus for use in a photographic camera comprising:
   a foldable enclosure defining a portion of an exposure chamber, said foldable enclosure including wall means, said wall means having an opening for the free passage of air and light therethrough; and
   electrostatic means, proximate said opening, for attracting airborne particulate matter that would otherwise pass through said opening without obstructing the passage of air and light through said opening.

2. The apparatus of claim 1, wherein said electrostatic means comprises an article serving only in part to define said wall means, said article having a high dielectric resistivity relative to the other parts serving to define said wall means, situate at said wall means and surrounding said opening without obscuring it, whereby static electric charges accumulating on said article attract dust that would otherwise pass through said opening.

3. The apparatus of claim 1, further comprising an electrically conducting surface defining said opening.

4. The apparatus of claim 2, wherein said article is polystyrene.

5. In a thin-walled, light opaque, flexible envelope for excluding light from an exposure chamber of a camera having a small opening in a wall of said envelope that allows communication between a viewing device associated with said camera and a focusing screen situated within said envelope, the improvement comprising electrostatic means, proximate said opening, for inhibiting airborne particulate matter from entering said envelope through said opening.

6. The improved envelope of claim 5, wherein said electrostatic means comprises an article, having a high dielectric resistivity, situate at said wall and surrounding said opening without obscuring it, whereby static electric charges accumulating on said article attract dust that would otherwise pass through said opening.

7. The improved envelope of claim 6, wherein said article is an insert, with a hole having a shape that defines said opening, that attaches to said wall.

8. The improved envelope of claim 7, further comprising an electrically conducting surface situate about the circumference of said hole in said annular insert.

9. The improved envelope of claim 7, wherein said insert is polystyrene.

10. In a thin-walled, light opaque, flexible envelope for excluding light from an exposure chamber of a camera and having a small opening in a wall of said envelope that allows communication between a viewing device associated with said camera and a viewing screen situated within said envelope, the improvement comprising an insert, of dielectric material, situate in said wall so as to surround said opening without obscuring it, whereby static electric charges accumulating on said insert attract dust that would otherwise pass through said opening.

11. The improved envelope of claim 10, further comprising an electrically conducting surface situate about the circumference of the opening in said insert.

12. The improved envelope of claim 10, wherein said insert is made from polystyrene.

13. A thin-walled envelope, formed from a flexible, light opaque material, for excluding light from an exposure chamber of a camera; an insert, in one wall of said envelope, said insert made from a dielectric material having a large resistivity; and an opening in said insert, said opening forming an entrance pupil for a viewing device associated with said camera.

14. The thin-walled envelope described in claim 13, further comprising a metallic lining for the perimeter of said opening.

15. The thin-walled envelope described in claim 13, wherein said insert is made from polystyrene.

16. The thin-walled envelope described in claim 13, wherein said insert is made from polytetrafluoroethylene.

17. An insert, made from a dielectric material of high resistivity, said insert having an opening therethrough for transmitting image forming light rays into a viewfinder, said insert being adapted for mounting in an opening through one wall of an opaque thin-walled, flexible envelope intended for excluding light from the exposure chamber of a camera.

18. The insert described in claim 17, further comprising a metallic lining on the perimeter wall of said opening.

19. The insert described in claim 17, wherein the material of said insert is polystyrene.

20. An insert for an optical device made from a material of high resistivity, said insert having an aperture therethrough, to permit the passage of light through said insert said insert being adapted for mounting in an opening through a wall made of a material with a lower resistivity, for capturing airborne particulate matter attempting to pass through said aperture in said insert without obstructing the passage of light through said aperture.

21. The insert described in claim 20, further comprising an electrically conductive lining on the edge of said insert that defines said aperture therein.

* * * * *